(12) United States Patent
Nozaki

(10) Patent No.: US 7,193,741 B2
(45) Date of Patent: Mar. 20, 2007

(54) DIGITAL PHOTO PROCESSING APPARATUS AND PRINTING DATA RECORDING METHOD

(75) Inventor: Iwao Nozaki, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 829 days.

(21) Appl. No.: 09/816,908

(22) Filed: Mar. 23, 2001

(65) Prior Publication Data

US 2001/0026371 A1 Oct. 4, 2001

(30) Foreign Application Priority Data

Mar. 28, 2000 (JP) .............................. 2000-088449

(51) Int. Cl.
H04N 5/225 (2006.01)
H04N 1/00 (2006.01)
G06F 15/00 (2006.01)

(52) U.S. Cl. .................... 358/1.16; 358/1.9; 358/1.15; 358/404; 358/444; 348/207.2

(58) Field of Classification Search ...... 358/1.14–1.17, 358/1.9, 404, 444; 378/207.1, 207.2, 207.11
See application file for complete search history.

(56) References Cited

U.S. PATENT DOCUMENTS

| | | | |
|---|---|---|---|
| 5,016,114 A | | 5/1991 | Sakata et al. |
| 6,064,427 A | | 5/2000 | Shiota et al. |
| 6,124,943 A | * | 9/2000 | Mitani ........................ 358/1.17 |
| 6,184,997 B1 | * | 2/2001 | Hanyu et al. ............... 358/1.15 |
| 6,192,184 B1 | | 2/2001 | Shiota et al. |
| 6,215,560 B1 | * | 4/2001 | Shimura et al. ............. 358/1.2 |
| 6,400,464 B1 | * | 6/2002 | Suehiro ...................... 358/1.16 |
| 6,476,933 B1 | * | 11/2002 | Honma ........................ 358/1.9 |
| 6,483,609 B1 | * | 11/2002 | Ueno et al. .................. 358/434 |
| 6,504,620 B1 | * | 1/2003 | Kinjo ......................... 358/1.15 |
| 6,552,819 B2 | * | 4/2003 | Osawa et al. ............... 358/1.17 |

FOREIGN PATENT DOCUMENTS

| | | |
|---|---|---|
| EP | 0 467 598 A | 1/1992 |
| EP | 0 869 660 A | 10/1998 |
| JP | 06 291987 A | 10/1994 |
| JP | 08 123630 A | 5/1996 |
| JP | 08-130702 | 5/1996 |
| JP | 10 016321 A | 1/1998 |
| JP | 10-271370 | 10/1998 |
| JP | 11-39466 | 2/1999 |
| JP | 11-95952 | 4/1999 |
| JP | 11-191879 | 7/1999 |
| JP | 11-234510 | 8/1999 |

* cited by examiner

Primary Examiner—Douglas Q. Tran
Assistant Examiner—Chan S. Park
(74) Attorney, Agent, or Firm—Fulbright & Jaworski L.L.P

(57) ABSTRACT

A digital photo processing apparatus with an input device (1) for receiving digitized image data, an image processor (14) for processing the image data to generate printing data, a digital printer (P) for making photo prints from the printing data, and a data recorder (9) for recording the printing data used by the digital printer on a removable recording medium. The data recorder (9) includes a resolution converter (91) for automatically converting the printing data to a proper resolution corresponding to the resolution of the digital printer (P). The resolution converter (91) is operable when the printing data has a volume exceeding an available capacity of the removable recording medium detected by a capacity checker (92).

7 Claims, 10 Drawing Sheets

DIGITAL PHOTO PROCESSING APPARATUS AND PRINTING DATA RECORDING METHOD

BACKGROUND OF THE INVENTION

1. Field of the Invention

This invention relates to a digital photo processing apparatus having an input device for receiving digitized image data, an image processor for processing the image data to generate printing data, a digital printer for making photo prints from the printing data, and a data recorder for recording the printing data used by the digital printer on a removable recording medium.

2. Description of the Related Art

Significant improvements have been made in recent years in the performance of digital photographing devices such as digital cameras (digital still cameras) and digital video cameras. Photo prints comparable in quality to those taken with a conventional optical camera may be obtained with such a digital camera by giving a proper image processing to the images and printing the images with a high-performance printer. Many photo processing shops and studios employ digital minilab systems, have the know-how of photo image processing, and own high-performance printers. Such shops have already started the service of printing or otherwise outputting image data acquired with digital photographing devices.

In particular, identification photos for use in applying for passports or licenses, or photos for use in social functions such as marriage arrangements, do not require a developing process and may be freely retaken. Thus, rapidly increasing numbers of photo shops and studios provide services relating to digital photos. When identification photos are taken with a digital camera at a photo shop or studio, for example, image data is acquired by photographing a person in a plurality of frames. The image data is put to an appropriate image processing, and displayed on a monitor screen. An optimal image is selected from the photo images displayed. Photo prints are made with a digital printer by using printing data of the selected photo image.

At this time, final image data used for making the prints may be saved on a removable recording medium such as a floppy disk in anticipation of a re-print order. The floppy disk may be handed to the customer along with the finished photo prints. This is a service unknown heretofore in making identification photos, for example, and will please the customers.

However, with a standard digital camera of the 2 megapixel type, the image data size of one still picture in 1600×1200 pixels in TIFF non-compression amounts to as much as 5.5 MB. Even a picture in 800×600 pixels has a data size reaching 1.4 MB. It is therefore impossible to use a floppy disk which is the simplest and cheapest removable recording medium. An MO disk or CD-R has a far larger storage capacity, but is far more expensive per piece. Thus, after all, image data is to be recorded in compressed form.

Lossy compression must be used to secure a sufficient compression ratio. However, to avoid image deterioration, compression ratio should be minimized within a range allowed in recording data on a removable medium. An adjustment of compression ratio for each of such image data would impose a heavy burden on the operator, and lower the productivity of a digital photo processing operation.

In addition, even where an MO disk or CD-R is used as a removable recording medium to save numerous, final photo image data from which photo prints have been made, such image data may still have to be compressed under certain circumstances, to add to the burden on the operator.

SUMMARY OF THE INVENTION

The object of this invention is to provide a technique associated with a digital photo processing apparatus of the type noted at the outset hereof, for reducing image data to be recordable on a removable recording medium, in a way to minimize lowering of image quality in time of re-printing.

The above object is fulfilled, according to this invention, by a digital photo processing apparatus comprising an input device for receiving digitized image data, an image processor for processing the image data to generate printing data, a digital printer for making photo prints from the printing data, and a data recorder for recording the printing data used by the digital printer on a removable recording medium, wherein the data recorder includes a resolution converter for automatically converting the printing data to a proper resolution corresponding to a resolution of the digital printer.

Generally, when digital images are printed by a digital printer, no improvement is made in output image quality by applying printing data with a resolution exceeding a proper resolution based on the resolution of the digital printer. Such a resolution of printing data is an excessive resolution. The invention is based on this technical knowledge.

When, for example, image data in 1600×1200 pixels as noted hereinbefore is received and the size of photo prints outputted is 8×6 cm, the resolution is approximately 500 dpi(ppi). This obviously is an excessive quality, considering that approximately 250–300 dpi is a proper resolution of image data for a digital printer employed in a photo processing studio or the like. A digital print head designed for printing paper and built into a minilab, for example, provides a gradation of about 256 stages in dots. Consequently, pixels of the image data may be in a one-to-one relationship with the dots printed by the print head. The print head generally used has a resolution of about 300 dpi. The resolution of image data appropriate to the print head, typically, is about 300 dpi, too. This applies to a sublimate printer often used as a photo image quality printer. As distinct from these printers, an ink jet printer has a print head hardly capable of producing multivalued tones from dot to dot (e.g. 4-valued tones at most even when a light color is used or dot diameter is varied). Thus, a pseudo gradation method has to be used in a printing process. Even if the resolution of the print head itself is 1200 dpi, a proper resolution of image data is about 250–300 dpi for this print head.

This invention takes the above fact into account and, when printing data to be saved for making additional prints at a later date is of excessive quality (i.e. its resolution exceeds a proper resolution for the digital printer used), the resolution converter converts the excessive resolution to the proper resolution for the digital printer used. Where, in the above example, 500 dpi is converted to 250 dpi with the size of photo prints remaining 8×6 cm, the data size becomes ¼. In this way, the data size may be reduced only by reducing the excessive quality to a proper level. The printing data may easily be stored in a low capacity medium like a floppy disk.

Where a printing paper printer or a sublimate printer is used as noted above, a proper resolution corresponding to the printer resolution need not necessarily match the resolution of the digital printer. The proper resolution may be somewhat higher than the printer resolution where the removable recording medium has enough available capacity. Conversely, where the printer resolution is higher than a desired print quality, the proper resolution may be slightly lower than the printer resolution.

In a preferred embodiment of this invention, the data recorder further includes a capacity checker for detecting an available capacity of the removable recording medium for recording the printing data, the resolution converter being operable when the printing data has a volume exceeding the available capacity detected by the capacity checker. With this construction, when the capacity checker finds that the recording medium has too small an available capacity for the printing data to be stored, and the printing data has an excessive quality, the resolution converter automatically operates to convert the excessive resolution to a proper resolution for the digital printer used. As a result, the operator may proceed with a digital photo processing operation without minding too much about the remaining capacity of the medium or the size of the printing data to be recorded thereon.

In another embodiment of this invention, the data recorder includes a data compressor for compressing the printing data having the resolution converted. With this construction, even when the capacity of the medium still is insufficient after the resolution converter converts the excessive resolution of the printing data to the proper resolution, the data size may be reduced by the image compression technique. Since the data size has already been reduced to some extent by the resolution converter, the compression ratio may be reduced significantly. Even where a lossy compression technique is used, the image quality of reprints may be lowered only to a negligible extent.

An operation to set a compression ratio for such a compression process is burdensome to the operator. In one preferred embodiment of this invention, the data compressor is operable with a compression ratio automatically set from a relationship between a volume of the printing data to be compressed and the available capacity of the removable recording medium. This construction simplifies the digital photo processing operation.

The foregoing object of this invention is fulfilled, according to a further aspect of this invention, by a method of recording printing data used by the digital printer on a removable recording medium, in a digital photo processing apparatus having an input device for receiving digitized image data, an image processor for processing the image data to generate printing data, and a digital printer for making photo prints by using the printing data. This method comprises the steps of checking an available writing capacity of a recording medium set to the input device, comparing the available writing capacity detected and a volume of the printing data to be recorded, and converting a resolution of the printing data without substantially lowering image quality when the printing data is unrecordable on the recording medium.

The various functions and advantages noted above may be realized also by this method of recording the printing data on the removable recording medium.

Other features and advantages of this invention will be apparent from the following description of the embodiment to be taken with reference to the drawings.

DESCRIPTION OF THE PREFERRED EMBODIMENT

A digital photo processing apparatus in one embodiment of this invention will be described hereinafter with reference to the drawings.

Figure 1:
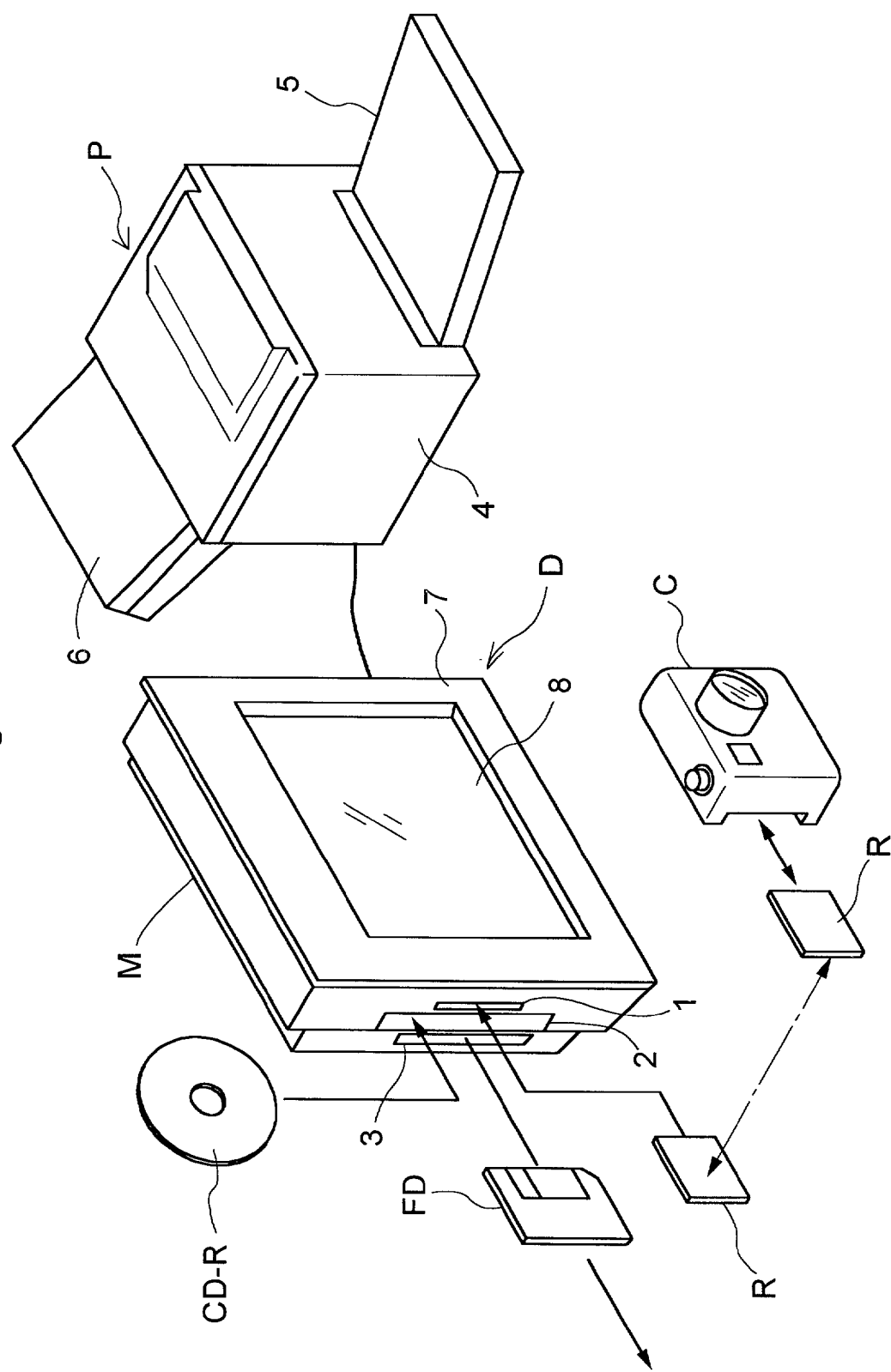
FIG. 1 is a perspective view of a digital photo processing apparatus according to this invention.

FIG. 1 shows the digital photo processing apparatus. This apparatus includes a general-purpose computer M having a touch panel type display D formed integrally therewith, and a sublimate digital printer P (hereinafter simply called the printer) for making photo prints based on image data processed by the general-purpose computer M. The general purpose-computer M further includes, connected thereto, an input device (media reader) 1 for reading image data from a recording medium R (e.g. Compact Flash, PC card, Smart Media or the like) recording photo image data obtained by photographing subjects with a digital camera (digital still camera) C, and a CD-R drive 2 and an FD drive 3 for reading and writing data from/to a CD-R and a floppy disk FD acting as removable recording media. The printer P has a sublimate print head (not shown) with a resolution of about 300 dpi mounted in a main body 4. The printer P causes the print head to print images on printing paper fed from a paper cassette 5, and outputs the paper to a discharge portion 6. The display D includes a main display body 7 and a touch panel 8.

This system displays an initial menu including options in the form of icons on the screen of display D. When selecting one of the options in the initial menu, the operator may only touch the corresponding icon with the tip of a finger. Thus, a processing item may be selected in a system employing what is known as GUI (Graphical User Interface). The initial menu presents four icons (not shown) representing the processes of "ID photo", "Digital camera", "Reorder" and "Digital camera print". When "ID photo" is selected, a process is carried out to output prints as ID photos in a predetermined size of personal image data acquired with the digital camera C. When "Digital camera" is selected, a process is carried out to output prints in a predetermined size of photo image data acquired with the digital camera C. When "Reorder" is selected, a process is carried out to output additional prints by using a floppy disk FD recording printing data and given to the customer along with a first set of prints.

Figure 2:
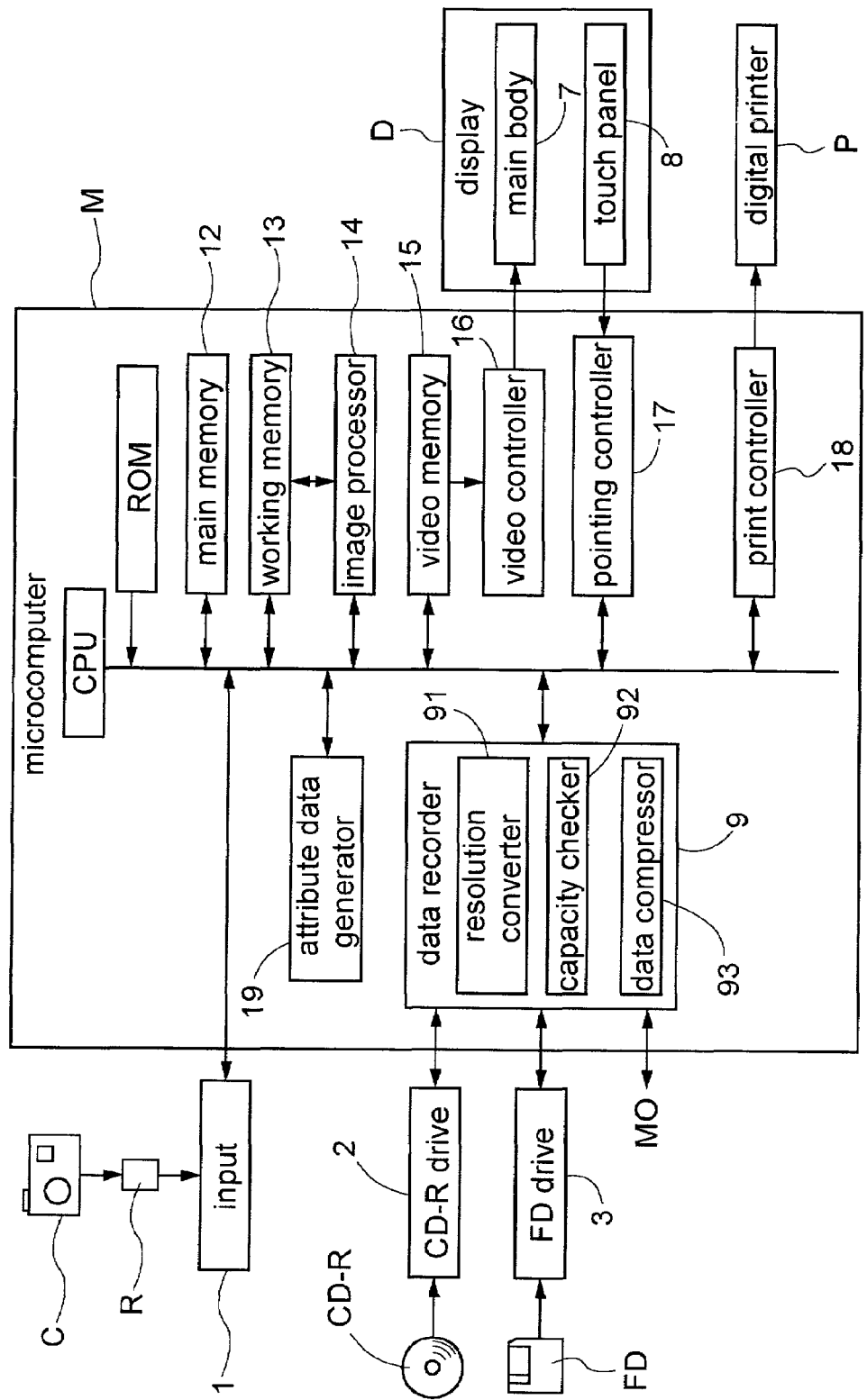
FIG. 2 a block diagram of a control system of the digital photo processing apparatus shown in FIG. 1.

The general-purpose computer M includes a CPU, ROM, RAM and interface circuits acting as central components thereof. Varied functions required of this digital photo processing apparatus are performed by hardware, software or both. In particular, the main functional elements relating to this invention include, as shown in FIG. 2, a main memory 12 for storing necessary programs and image data received through the input device 1, an image processor 14 for transferring image data to be processed, among the image data stored in the main memory 12, to a working memory 13, and performing various image processing on the data such as trimming and tone correction, an attribute data generator 19 for generating order attribute data such as customer names and customer addresses obtained through a manual input or a mechanical input using a card reader or the like, and image attribute data relating to the image data processed, a video memory 15 and a video controller 16 for making video output to the main display body 7, a pointing controller 17 for processing signals from the touch panel 8 and transmitting various command signals to the CPU, a print controller 18 for controlling the printer P based on printing data finally generated by the image processor 14, and a data recorder 9 for recording the finally generated printing data, along with the order attribute data and image attribute data, on a removable recording medium such as a floppy disk FD in preparation for possible additional printing afterward.

The data recorder 9 includes a resolution converter 91 for changing a resolution of printing data to be recorded on the floppy disk FD to 300 dpi which is a proper resolution corresponding to the resolution of printer P (i.e. 300 dpi of the sublimate type in this embodiment). (The printer used here is the sublimate type with a printer resolution of 300 dpi, and it is known that a resolution of image data exceeding 300 dpi will hardly contribute to an improvement in image quality.) The data recorder 9 further includes a capacity checker 92 for detecting a recording capacity of floppy disk FD mounted in the FD drive 3, and a data compressor 93 for compressing printing data with a compression ratio set as desired.

Next, an operation of the digital photo processing apparatus will be described, with reference to making of ID photos at a photo studio.

Figure 3:
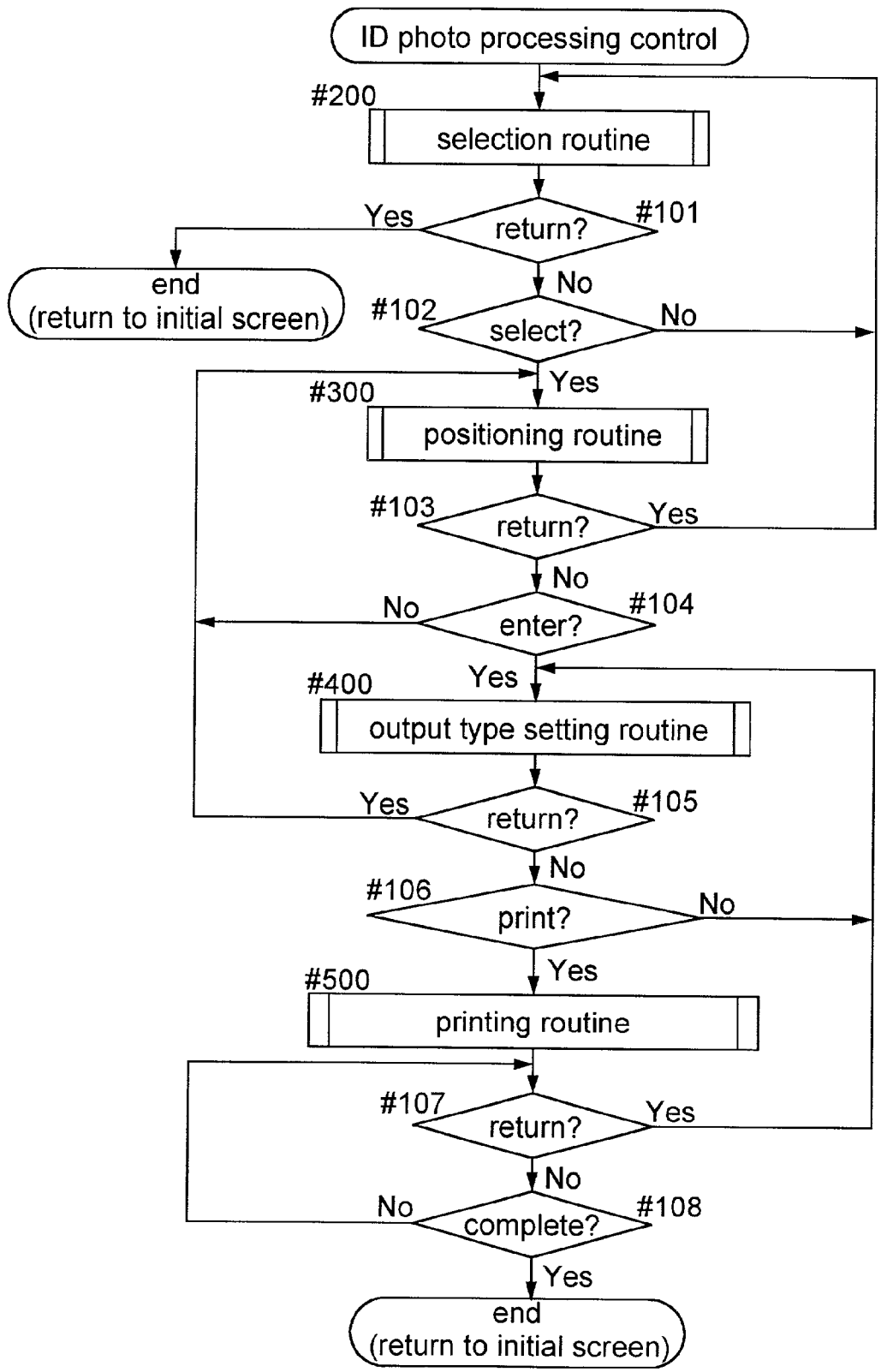
FIG. 3 is a flow chart of a processing control for an identification photo.

A recording medium R with photo data of the upper half of a customer recorded thereon is first set to the input device 1 (i.e. the media reader here). When "ID photo" is selected from the initial menu, the apparatus executes an ID photo processing control as shown in the flow chart of FIG. 3. In this control, a selection routine (step #200), a positioning routine (step #300), an output type setting routine (step #400) and a printing routine (step #500) are carried out in the stated order (steps #101–#108). When "ID photo" is selected with no recording medium R set to the input device 1, a message such as "Set a memory card." appears on the display D.

Figure 4:
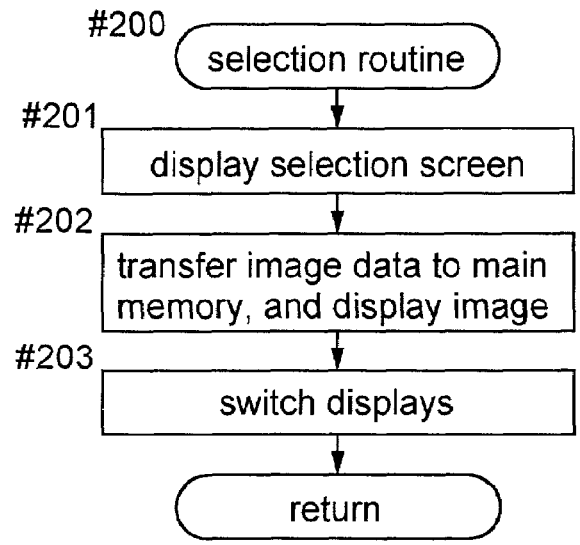
FIG. 4 is a flow chart of a selection routine.
Figure 5:
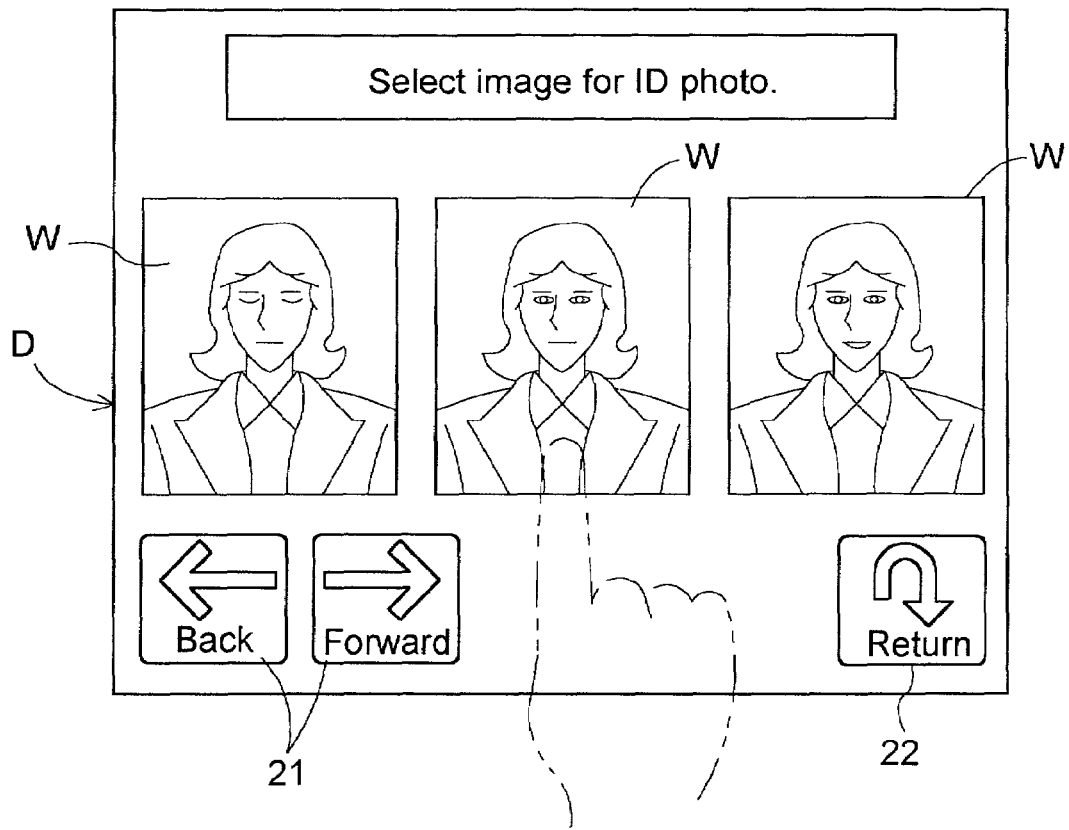
FIG. 5 is a view showing a selection screen.

In the selection routine (step #200), as shown in the flow chart of FIG. 4, a selection screen as shown in FIG. 5 appears on the display D (with no personal images displayed in three windows W on the selection screen at this stage) (step #201). Pertinent photo image data are successively transmitted from the recording medium R to the main memory 12 of general-purpose computer M, and images are displayed in the three windows W (step #202). Generally, three ID photos are taken at a time, and the images may just be allocated to the three windows W. When three or more ID photos are taken, the screen may be scrolled to display a next photo image by placing a finger on an arrow switch 21 displayed on the screen (step #203).

When a finger is placed on a return switch 22 on the screen shown in FIG. 5, the operation returns to the initial screen (step #101). One of the photo images in the windows W of this screen on the display D may be touched directly to select this photo image for print output (step #102). Then, the corresponding image data is transmitted to the working memory 13, and the positioning routine is executed next.

Figure 6:
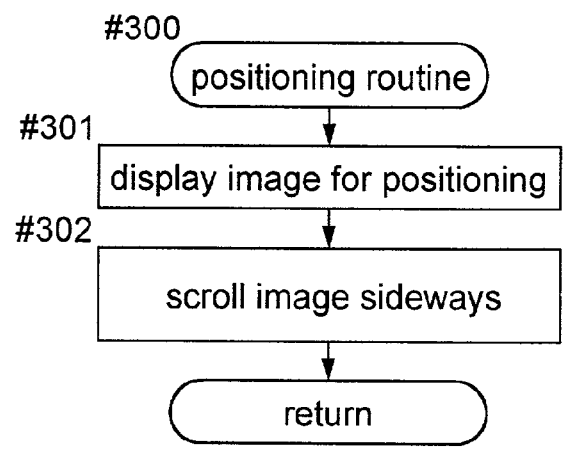
FIG. 6 is a flow chart of a positioning routine.
Figure 7:
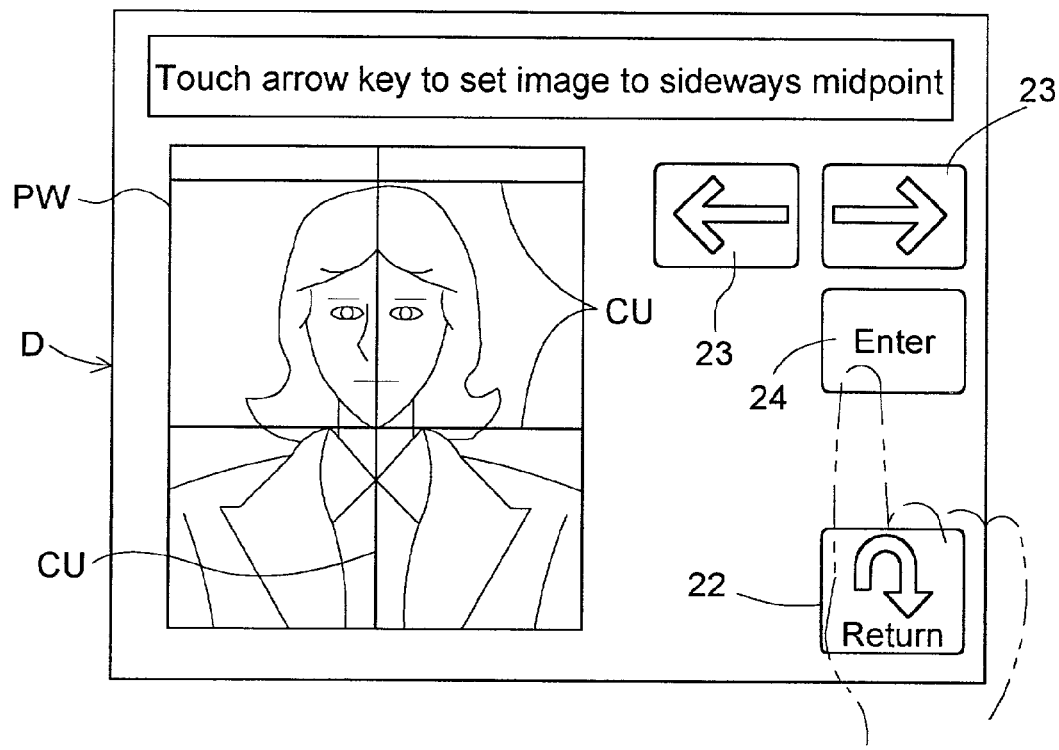
FIG. 7 is a view showing a positioning screen.

In the positioning routine (step #300), a process is carried out as shown in the flow chart of FIG. 6, to display a positioning screen as shown in FIG. 7 on the display D (step #301). A preview window PW formed on this screen displays the photo image based on the image data transmitted to the working memory 13, along with a cursor CU. By touching arrow switches 23 on the screen with a finger, the personal image may be moved right and left to set the image to a sideways middle position (step #302). Instead of this process, the cursor CU may be moved to determine the middle position of the personal image. Besides the process of positioning the image sideways, a vertical positioning process and a zoom-mode image size adjusting process may be performed to enable a fine setting.

In the display state based on the positioning routine, as shown in FIG. 7, an enter switch 24 on the screen may be touched with a finger to determine selections to be made (step #104). Then, a trimming process is carried out to determine sideways and other compositions for the image, which is followed by an output type setting routine. However, when the operator touches the return switch 22 displayed on the display D, the operation returns to the selection routine (step #103).

Figure 8:
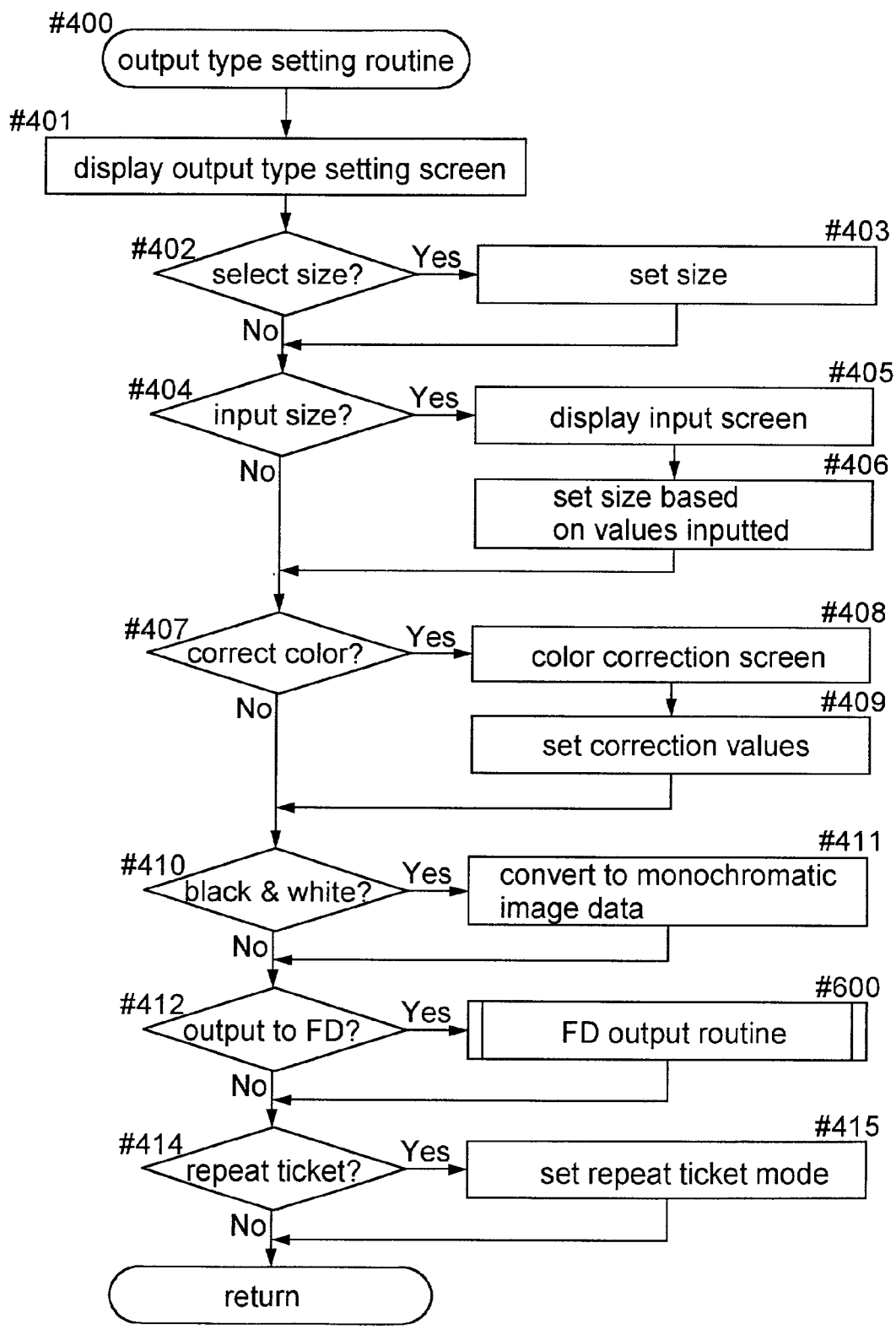
FIG. 8 is a flow chart of an output type setting routine.
Figure 9:
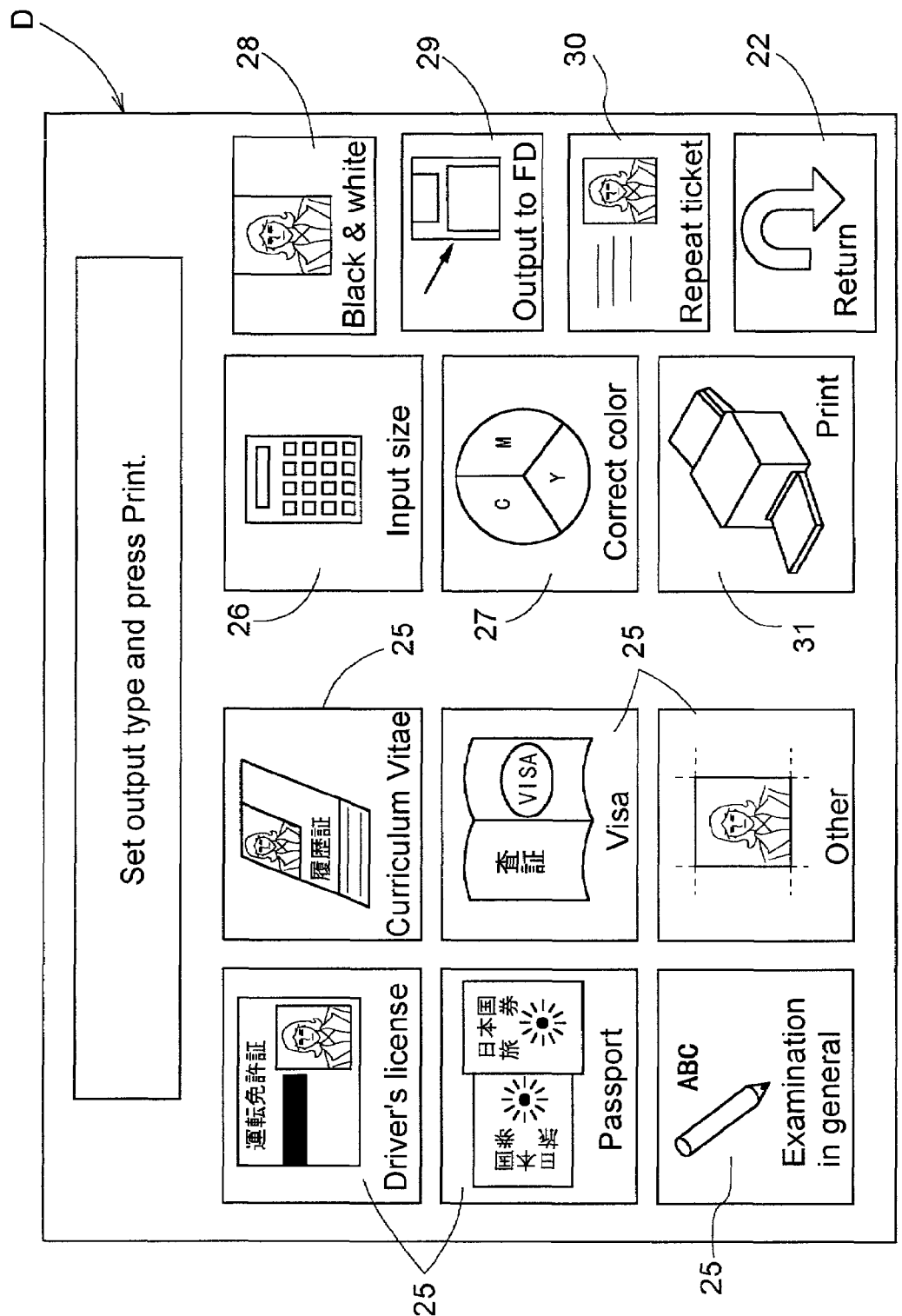
FIG. 9 is a view showing an output type setting screen.

In the output type setting routine (step #400), a process is carried out as shown in the flow chart of FIG. 8, to display an output type setting screen as shown in FIG. 9 on the display D (step #401). Specifically, the screen includes six size-select switches 25 for "Driver's license", "Curriculum Vitae", "Passport", "Visa", "Examination in general" and "Other". When one of these size-select switches 25 is touched, a process is carried out to set the selected size (steps #402–#403). When the operator touches a size input switch 26 displayed on the screen, an input screen (not shown) is displayed and a size is set based on values inputted to this input screen (steps #404–#406). When the operator touches a color correct switch 27 displayed on the screen to correct color, a color correction screen (not shown) is displayed for setting correction values (steps #407–#409). When the operator touches a black & white switch 28 to obtain monochromatic prints, image information is converted into monochrome data (steps #410 and #411). These image processes for the image data stored in the working memory 13 are performed by the image processor 14. When all of the above image processing is completed, the image data in the working memory 13 waits to be transmitted as printing data to the print controller 18. This final image data, i.e. printing data, may be stored in a floppy disk FD for use in making additional prints at a later date. In this case, the operator touches an FD output switch 29 displayed on the screen to record the printing data on the floppy disk FD (steps #412 and #600) as described in detail later. Where repeat tickets are issued to facilitate orders for additional prints, the operator may touch a repeat ticket switch 30 to set a mode (not shown) for printing a date of photography and an order number on the same paper that the ID photos are printed (steps #414 and #415).

When the operator touches a print switch 31 displayed on the screen, as shown in FIG. 9 (step #106), a printing routine is executed next. When the operator touches the return switch 22 displayed on the display D, the operation returns to the positioning routine (step #105).

Figure 10:
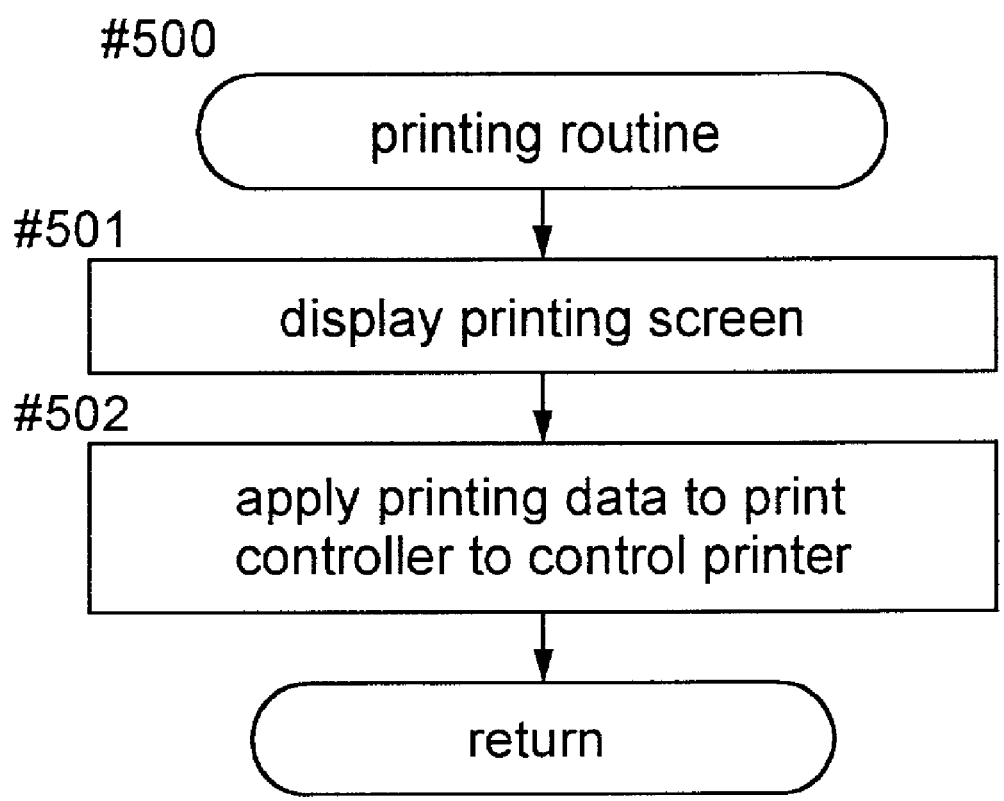
FIG. 10 is a flow chart of a printing routine.
Figure 11:
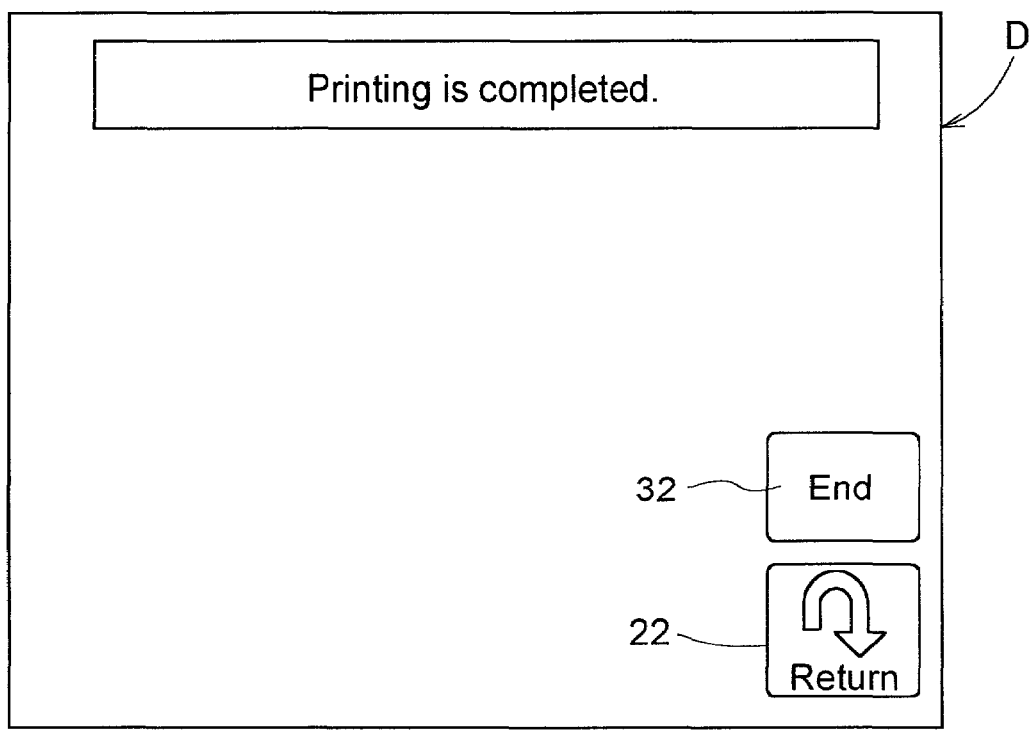
FIG. 11 is a view showing a printing screen.

In the printing routine (step #500), a process is carried out as shown in the flow chart of FIG. 10, to display a printing screen as shown in FIG. 11 on the display D (step #501). The image data loaded in the working memory 13 is transmitted as printing data to the print controller 18 to control the digital printer P (step #502). As the printing routine is performed, the digital printer P outputs a predetermined number of ID photo prints of the size set in the output type setting routine. When, subsequently, the operator touches an end switch 32 displayed on the display D, the operation returns to the initial screen (step #107). When the operator touches the return switch 22, the operation returns to the output type setting routine (step #106).

Figure 12:
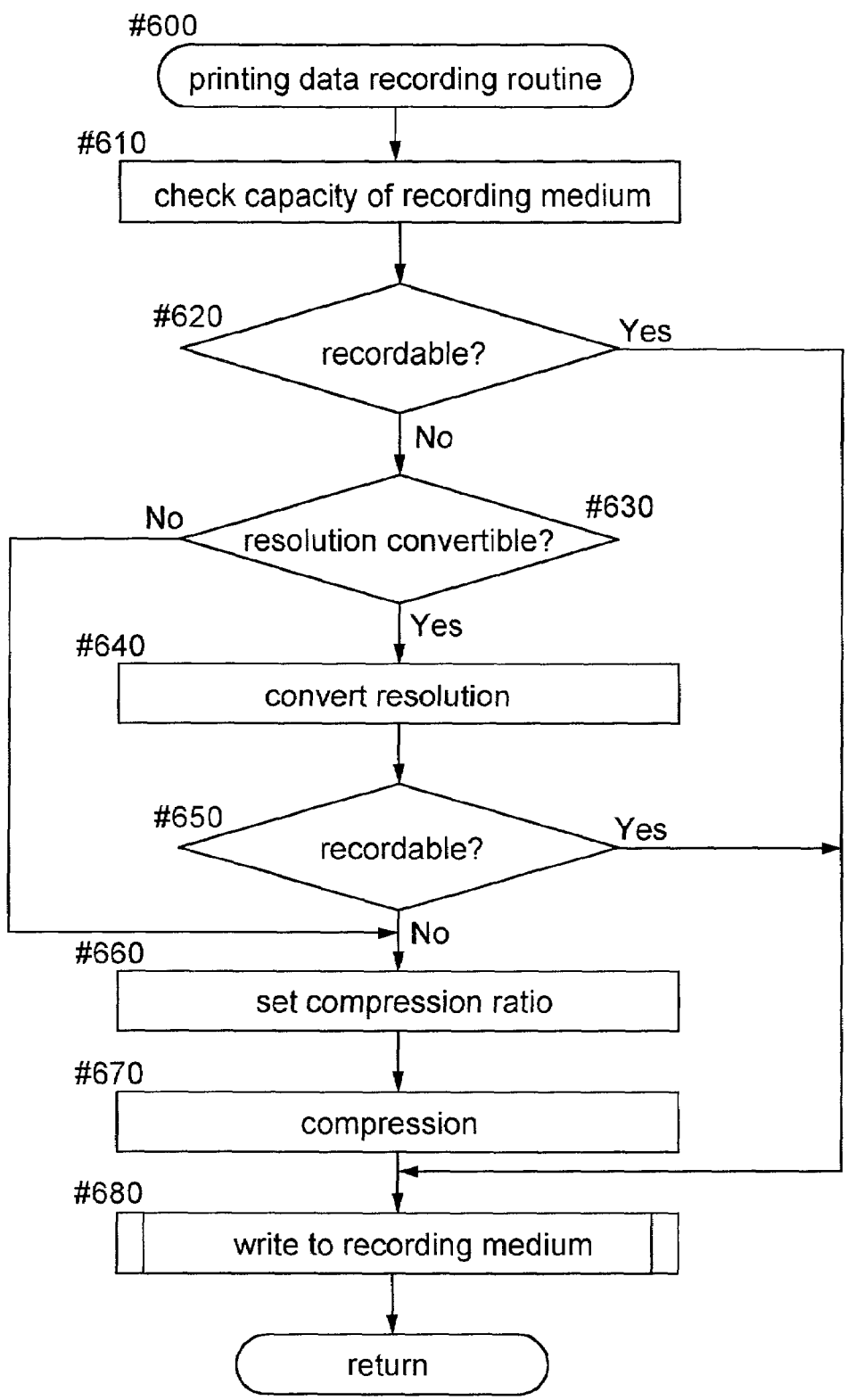
FIG. 12 is a flow chart of a printing data recording routine.

Next, a printing data recording routine will be described with reference to FIG. 12.

First, the capacity checker 92 accesses the floppy disk FD acting as a recording medium set to the input device 1, and checks its capacity available for writing (step #610). A comparison is made between the available capacity detected and the volume of printing data loaded in the working memory 13 (step #620). When the printing data can be recorded on the floppy disk FD in the current state ("Yes" from step #620), the operation jumps to a writing routine at step #680. When the printing data cannot be recorded on the floppy disk FD in the current state ("No" from step #620), checking is made whether the resolution of the printing data may be converted without substantially lowering image quality (step #630). This checking is made in order to determine whether the printing data to be recorded has a resolution exceeding 300 dpi which is a proper resolution based on the resolution of digital printer P used. The resolution of the printing data may be derived from the print size, for example. Where the size of the printing data is 1600×1200 pixels and the size of photo print output is 8×6 cm, the resolution is approximately 500 dpi. This is an excessive resolution which may be reduced to at least about 300 dpi.

When a resolution conversion is possible ("Yes" from step #630), the resolution converter 91 converts the resolution, in the above example, from 500 dpi to 300 dpi, whereby the data volume is reduced to about a half (step #640). Further, checking is made whether the printing data with the resolution converted may be recorded on the floppy disk FD (step #650). When the printing data is found recordable ("Yes" from step #650), the operation jumps to the recording routine (step #680). When recording of the printing data remains impossible despite the resolution conversion ("No" from step #650), the data compressor 93 carries out a data compression at steps #660 and #670. Also when the resolution conversion is found impossible at step #630, the operation jumps to step #660 for data compression.

The compression processing of the printing data by the data compressor 93 employs JPEG compression well known as a photo image compression method. First, a compression ratio just enough to enable recording of the printing data is determined from the size of the printing data and the available capacity of floppy disk FD (step #660). Then, the printing data is compressed with the compression ratio determined (step #670).

The compressed printing data, or the printing data found recordable after the resolution conversion at step #650, or, in some cases, the printing data, though still raw data, found recordable at step #620, is recorded on the floppy disk FD by the FD drive 3 in a "write to floppy disk FD (recording medium)" routine (step #680). In the write to recording medium routine, order attribute data such as customer name and customer address, and image attribute data relating to the image data forming the basis for the printing data, generated by the attribute data generator 19, are written along with the printing data to the floppy disk FD.

In the above description made with reference to the flow charts, the floppy disk FD has been used as a recording medium. Of course, an MO disk, a CD-ROM and other removable recording media may be used likewise.

With the above printing data recording routine, floppy disks may be distributed smoothly in services relating to identification photos, for the purpose of additional prints. The data size reduction by the above resolution conversion and the like is important not only in the identification photo services described hereinbefore, but also in digital photo services. This is because, in digital photo services, large numbers of frames are printed, and the printing data recorded for making additional prints have correspondingly large sizes. In such cases, mass recording media such as CD-Rs and MO disks are used. However, from the viewpoint of customer maintenance management, it is highly desirable, wherever possible, to record printing data for numerous frames on a single disk. The above processing routine in the identification photo service is varied for the digital photo service substantially only in that the checking whether printing data is recordable on a recording medium is carried out for the image data of all frames.

In the above embodiment, image data acquired with a digital camera is used as digitized image data. Of course, image data acquired with a digital video camera may be processed also. Further examples of image data falling within the scope of this invention are image data digitized by a film scanner or flat bed scanner, and image data created by CG software.

What is claimed is:

1. A digital photo processing apparatus comprising:
   an input device for receiving digitized image data;
   an image processor for processing said image data to generate printing data;
   a digital printer for making photo prints from said printing data; and
   a data recorder for recording said recording reprinting data for reprinting said photo prints used by said digital printer on a removable recording medium to be distributed to a customer, said data recorder comprising:
   a drive for said removable recording medium;
   a capacity checker for detecting an available capacity of said removable recording medium set to said drive; and
   a resolution converter operable to lower a resolution of the reprinting data to a proper resolution where image quality of reprints is not lowered in relationship to a resolution of said digital printer when said reprinting data has a volume exceeding said available capacity detected by said capacity checker.

2. A digital photo processing apparatus as defined in claim 1, wherein said data recorder includes a data compressor for compressing said reprinting data having the resolution lowered.

3. A digital photoprocessing apparatus as defined in claim 2, wherein said data compressor is operable with a compression ratio automatically set from a relationship between a volume of said reprinting data to be compressed and the available capacity of said removable recording medium.

4. A digital photo processing apparatus as defined in claim 1, further comprising an attribute data processor for generating order attribute data such as a customer name and a customer address to be recorded along with said reprinting data on said removable recording medium.

5. In a digital photo processing apparatus having an input device for receiving digitized image data, an image processor for processing said image data to generate printing data, and a digital printer for making photo prints from said printing data, and a drive for recording reprinting data for reprinting said photo prints used by said digital printer on removable recording medium, a method of recording said reprinting data used by said digital printer on the removable recording medium, comprising the steps of:

checking an available writing capacity of said recording medium set to said input device;

comparing said available writing capacity detected and a volume of said reprinting data to be recorded;

converting a resolution of said reprinting data without substantially lowering image quality when said reprinting data is not recordable on said recording medium;

checking whether the resolution of the reprinting data may be converted to a proper resolution where image quality of reprints is not lowered in relationship to a resolution of said digital printer when said reprinting data has a volume exceeding said available writing capacity detected by said capacity checker; and lowering the resolution of the reprinting data to the proper resolution when the resolution conversion to the proper resolution is possible.

6. A method as defined in claim 5, further comprising a step of compressing said reprinting data with a compression ratio for enabling recording of said reprinting data on said recording medium, when said reprinting data remains not recordable-on said recording medium after the resolution is lowered.

7. A method as defined in claim 5, further comprising a step of recording order attribute data such as a customer name and a customer address on said removable recording medium.

* * * * *